Sept. 17, 1963 M. B. RATH 3,103,958
LIQUID FILL ASSEMBLY
Filed March 23, 1961

*INVENTOR.*
MICHAEL B. RATH
BY
Oberlin, Maky & Donnelly
ATTORNEYS

United States Patent Office 3,103,958
Patented Sept. 17, 1963

3,103,958
LIQUID FILL ASSEMBLY
Michael B. Rath, Lorain, Ohio, assignor to The Standard Oil Company, Cleveland, Ohio, a corporation of Ohio
Filed Mar. 23, 1961, Ser. No. 97,886
4 Claims. (Cl. 141—96)

This invention relates to an assembly for filling a liquid storage tank and has for a primary object the provision of such an assembly which will in operation produce a signal when the fill is completed to alert the operator to terminate the supply of the liquid.

It has been my more particular concern to provide improved fill means for use with the underground storage tanks of gasoline stations, these being provided with top fill pipes terminating in boxes set in the driveways of the stations. Such tanks are not equipped with liquid level indicators, the contents being periodically checked by means of a dip stick and the tank filled when necessary from a truck tank. The driver of the truck called to service the station must compute the amount necessary to refill the storage tank, from a preliminary dip stick measurement and the known tank capacity, and then supplies the gasoline through a hose connection on the truck, the latter being provided with a suitable gauge to indicate the quantity discharged. In other words, the driver must make his calculation and then closely attend the supply to shut off the flow at the truck when the measured delivery reaches the computed quantity. An error of computation of the amount to be delivered if excessive causes the storage tank to overflow and gasoline to be spilled on the station driveway. Moreover, even if the truck tank valve is immediately shut off, the driver is left with a quantity of gasoline in the hose. The same hazardous conditions can result from failure of the driver to shut off the flow at the proper time through diversion or inattention.

The present invention was developed to reduce the possibility of error and mishap in such servicing of gasoline stations by providing the driver, for the first time, with a signal indication of the actual liquid level in the underground tank during the fill operation. It will of course be appreciated that there may be numerous liquid storage tank installations presenting similar problems and that the new assembly can be used therewith to equal advantage.

A more particular object is to provide a liquid fill assembly which is in part a nozzle end for connection to a delivery hose and the like through which liquid is supplied to the storage tank.

It is a further object of the invention to provide such a fill assembly, which can be used with existing storage tank installations, including underground tanks, without significant modification of the existing structure.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
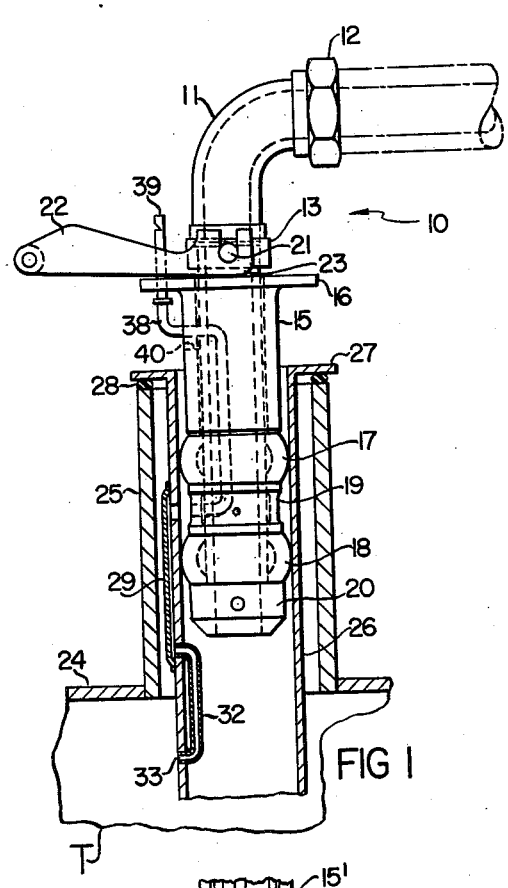
FIG. 1 is an elevation of a liquid fill assembly in accordance with the present invention, with certain parts in section and broken for convenience.

Referring now to the drawings in detail, reference numeral 10 designates generally a fill tube adapted for connection to the delivery end of a truck tank hose and the like. This tube comprises an elbow 11 one end 12 of which would be connected to the end of such hose or line, for example, by a threaded engagement therewith. In the disposition shown, the elbow has integral collar 13 at the other end of the bend and a somewhat reduced straight tubular extension 14.

A main sleeve 15 having an upper end flange 16 is slidably fitted on the extension 14 with its upper end adjacent the collar 13. An upper sealing sleeve 17 of resiliently deformable material, which will not be adversely affected by exposure to the particular liquid or liquids to be handled, loosely encircles the extension 14 below the main sleeve 15, and there is a similar lower sealing sleeve 18 separated from the upper sleeve by an intermediate collar 19. A stop ring 20 is secured to the extension 14 about the lower end of the same and retains the several sliding elements thereabove on the extension.

The elbow collar 13 is provided with a pair of diametrically opposed projecting pins, one being shown at 21, and a handle 22 is pivoted on such pins. The shape of the handle is such that the same has inner or lower shoulders 23 engaging the flange 16 of the main sleeve 15 slidable on the extension 14 for camming the same. Such handle is normally generally vertical and in this position permits the main sleeve 15 to move upwardly from the position thereof shown in FIG. 1. This added clearance is enough for the sealing sleeves 17 and 18 to assume their normal cylindrical form, urging the main sleeve and the intermediate collar 19 upwardly on the extension 14 by reaction against the retainer ring 20 at the bottom of the same. When the handle is pivoted downwardly to the substantially horizontal position shown in FIG. 1, its shoulders 23 cam the several sleeves downwardly against the stop ring, with the sealing rings being axially compressed and deformed outwardly as shown for engagement with a surrounding tube or pipe.

Reference numeral 24 designates the top of a liquid storage tank T, such as an underground storage tank of a gasoline station, and a fill pipe 25 extends upwardly from the top of such tank. In the gasoline station installation, it will be understood that the upper end of the fill pipe will be located in a fill box, not shown, recessed in the station driveway and normally closed by a suitable cover. According to the present improvements, a separate tube 26 is inserted in the fill pipe 25, this tube being of slightly smaller diameter and having a flanged upper end 27 resting on the end of the tank fill pipe with a suitable seal ring 28 therebetween. The tube 26 forms a liner which receives the hose-connected fill tube 10, and tube 26 will normally extend substantially to the bottom of the storage tank, with an angularly cut lower end, to avoid pressure buildup therein. In FIG. 1, the inserted tube 26 is provided with a longitudinally extending manifold 29 having an inlet 30 through the tube wall in its lower portion and an outlet 31 similarly through the wall of the tube in its upper portion. A small diameter air line 32 extends from the manifold inlet 30 downwardly along the interior of the tube 26 to a lower opening 33 in the wall of the latter at a predetermined spacing below the interior of the top 24 of the storage tank; this distance may, for example, be on the order of three to four inches.

The fill tube reception or insertion in the tank tube 26 is determined by suitable stop means, not shown, to locate the upper manifold outlet 31 between the sealing sleeves 17 and 18, with the lower end of the manifold 29 and connected line 32 below the inner end of the thus inserted fill tube 10. The latter is of course inserted with the handle 22 in its up condition, and the handle is then swung or pivoted downwardly to cause the sealing sleeves 17 and 18 to expand into contact with the tank tube 26 for vapor sealing of the same as illustrated. It will be noted that the use of two sealing sleeves provides a sealed intermediate space 34 about the collar 19 on the fill tube extension 14.

Figure 2:
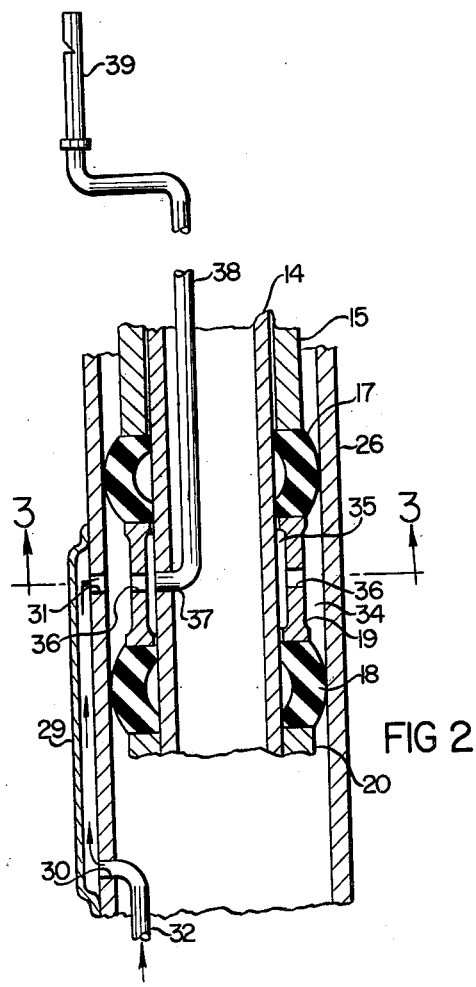
FIG. 2 is a fragmentary longitudinal section of the assembly on an enlarged scale.

This collar has, as best shown in FIG. 2, enlarged upper and lower ends which serve to space the main wall thereof outwardly from the fill tube extension, whereby an annular inner void 35 is provided. The collar has a plurality of holes 36 in its such main wall portion to afford communication from the outer space 34 between the two sealing rings and such inner annular void 35, and the fill tube extension 14 has a port 37 in its wall which occurs in the void area. A small fluid line 38 extends from the inner end of said extension port 37 upwardly along the interior of the extension 14 to an exposed upper portion of the main sleeve 15 and then outwardly through the extension to an air operated signal here in the form of a whistle 39. The passage of the line 38 through the wall of the extension is of course sealed, while the wall of the main sleeve 15 and its flange will of course be slotted as indicated at 40 for clearance about the external upper extent of the line 38 and the connected whistle 39.

With regard to the operation of the new assembly, it will be assumed as earlier noted that the tank is an underground gasoline station storage tank and that the fill tube 10 is at the end of a truck tank hose. Such fill tube is positioned and sealed within the tank tube in the manner illustrated and gasoline permitted to flow through the same from the truck and valve means thereon. The incoming flow of gasoline causes air to be exhausted from the storage tank not only through the usual vent line but also through the fill assembly. Air is thus caused to flow from the top interior of the storage tank through the lower interior line 32 carried by the tank tube 26 to the manifold 29 of the latter. From the manifold, the air enters the space 34 between the two seals 17 and 18 and passes through the holes 36 in the collar 19 to the inner void 35 between the same and the fill tube extension 14. The air then proceeds through the extension line 38 upwardly to the whistle 39, where its discharge of course produces an audible signal.

This audible signal will accordingly start when the fill is commenced and will continue until the rising liquid covers the lower port 33 in the tank tube 26 which is the inlet for the air supply of the whistle. As indicated, this port is preferably a few inches below the top 24 of the storage tank and, when the noise of the whistle ceases, the tank truck driver is alerted to shut off the delivery. It will incidentally be apparent that the height of the main wall of collar 19, and hence the inner void 35, is sufficient that exact register of the lower inlet end of the extension line 38 is not required.

Figure 4:
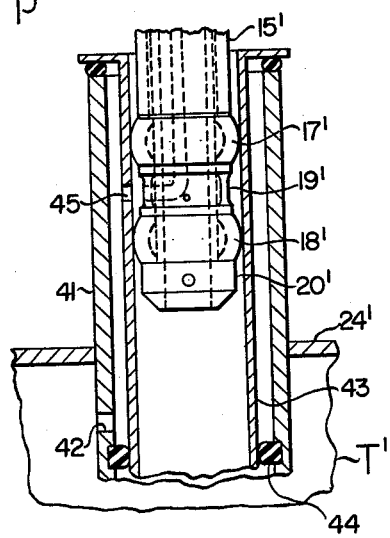
FIG. 4 is a fragmentary elevation, with certain parts in section, of a slightly modified form of the assembly.
Figure 3:
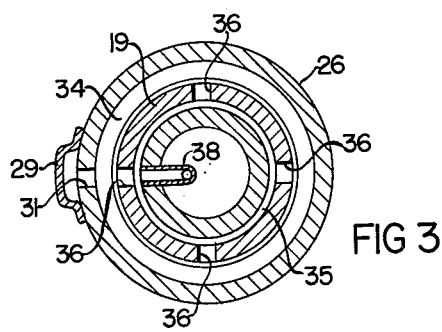
FIG. 3 is a transverse section as viewed from the plane of the line 3—3 in FIG. 2.

In the modification illustrated in FIG. 4, like components are indicated by the primed reference numerals, and it will be seen that this assembly differs in the arrangement of the tank tubes. The fill pipe 41 of the tank here extends sufficiently into the body of the tank to locate the entry port 42 for signal air in the same, at the desired relatively small spacing below the tank top. The inserted tube 43 is sealed to such internal portion of the fill pipe 41 below the port 42, for example, by a seal ring 44, with an upper port 45 in the same at the region between the two sealing sleeves 17' and 18' of the fill tube 10' as inserted. The sealed space 34' between the tube and the fill pipe, above the seal ring 18, thus provides for flow of the air therethrough to the fill tube air line 38' and the whistle 39', without requiring a special line and manifold as in the first described form of the invention. The operation of the FIG. 4 modification will otherwise be the same as described.

The two illustrated forms thus comprise in common liner means or a tank inlet tube for installation in the liquid storage tank fill pipe and means for establishing an air vent therethrough to an outer portion which receives the fill tube. The special vent passage in each case is completed through the fill tube itself to the whistle or air-operated signal means carried thereby, with the passage by-passing the lower sealing zone at the outside of the inlet tube and the upper sealing zone through the interior of the fill tube to maintain the seals intact.

In both cases, then, the invention provides the workman performing the fill with reliable indication of the actual liquid level in the storage tank. The possibility of hazardous overflow by reason of error in computing the amount of the fill is eliminated, and the audible signal is of course a more effective determinant than the prior reading of a gauge, insofar as the attention of the operator is concerned. It will also now be apparent that the new assembly is very readily adapted to existing liquid storage tanks as well as new installations of the same, and that these may be in widely varying environments.

Other modes of applying the principle of the invention may be employed, change being made as regards the details described, provided the features stated in any of the following claims or the equivalent of such be employed.

I, therefore, particularly point out and distinctly claim as my invention:

1. In a liquid fill assembly for use with a storage tank having a top inlet pipe, a fill tube adapted for connection to a liquid delivery hose and the like and having a tubular extension for insertion in the inlet pipe of such a storage tank, a pair of resiliently deformable seals on said extension, a spacer on the extension between the seals to hold the same in axially spaced-apart relation, means for axially compressing said seals after insertion of the extension in the tank inlet pipe to deform the same outwardly into vapor sealing engagement with the pipe above and below the spacer on the extension, means for venting the resulting void between the thus operative seals through the fill tube extension including an air line which proceeds outwardly within the extension to an exposed portion of the fill tube, pneumatic signal means carried by the fill tube in connection with the outer end of said air line, and means for conducting air from the interior top of the tank to the sealed void formed in use of the fill tube about the spacer on the extension, whereby air is expelled from the tank during a filling operation through the fill tube to operate the signal means of the same.

2. A fill tube adapted for connection to a liquid delivery hose and the like, comprising a tubular extension for insertion in the inlet pipe of a liquid storage tank, first and second resiliently deformable sealing sleeves on said extension, a spacer sleeve also on said extension between the sealing sleeves, means for axially compressing the sealing sleeves to deform the same outwardly into vapor sealing engagement with an inlet pipe in which the extension is inserted, the spacer sleeve being apertured for air passage transversely therethrough and the tubular extension having a port in the wall portion thereof embraced by the spacer sleeve when the sealing sleeves are thus operative, an air line extending along the interior of the extension from said port to an outer non-inserted part of the fill tube, and pneumatic signal means carried by the fill tube in connection with the outer end of said air line, whereby the tank can be provided with a vent to the interior of the inlet pipe between the sealing seals when in sealing condition to operate the signal means of the fill tube while the tank is being filled through the same.

3. In combination with a storage tank having a top inlet pipe, a fill tube assembly having a tubular extension partially inserted in spaced relation within said inlet pipe, said assembly being adapted to receive at its outer end a liquid delivery hose for filling of the tank through said extension, a pair of axially spaced seals interposed between said extension and a surrounding portion of said inlet pipe, said seals precluding passage of vapor and providing a sealed void between said inlet pipe and said extension, with the seals defining the top and bottom of said void, means for venting said void between the seals through the fill tube extension including an air line which proceeds outwardly within the extension to an exposed portion of the fill tube assembly, pneumatically operable means carried by the fill tube assembly in connection with the outer end of said air line, and means for conducting air from the interior top of the tank to said void, whereby air expelled during filling thereof to a predetermined level proceeds outwardly through the fill tube assembly to said pneumatically operable means to maintain the same operative during such filling of the tank, the occurrence of the predetermined filled tank level being indicated by termination of such operative condition of said pneumatically operable means.

4. In combination with a storage tank having a top inlet pipe, liner means seated in said pipe and sealed to the top thereof, a fill tube assembly having a tubular extension partially inserted within said liner, said assembly being adapted to receive at its outer end a liquid delivery hose for filling of said tank through said extension, air passage means leading from a pneumatically operable level responsive means extending through said fill tube extension and terminating in a radially outwardly directed aperture in said extension, air passage means leading from a predetermined height in said tank through said liner and terminating in a radially inwardly directed aperture in said liner, both said apertures being horizontally aligned when said extension is thus partially inserted within said liner, and means operative simultaneously sealingly to couple said air passages and peripherally to seal said extension within said liner whereby air will be vented through said passages to said pneumatically operable level responsive means during a filling operation until a predetermined level within said tank is obtained.

References Cited in the file of this patent
UNITED STATES PATENTS 2,441,872   Di Renzo _____ May 18, 1948
2,580,157   Chadwick _____ Dec. 25, 1951